US009734654B2

(12) United States Patent
Vogt

(10) Patent No.: US 9,734,654 B2
(45) Date of Patent: Aug. 15, 2017

(54) PARKING METER POLE

(71) Applicant: Christopher M. Vogt, Chisago City, MN (US)

(72) Inventor: Christopher M. Vogt, Chisago City, MN (US)

( * ) Notice: Subject to any disclaimer, the term of this patent is extended or adjusted under 35 U.S.C. 154(b) by 159 days.

(21) Appl. No.: 14/687,278

(22) Filed: Apr. 15, 2015

(65) Prior Publication Data

US 2015/0294526 A1 Oct. 15, 2015

Related U.S. Application Data

(60) Provisional application No. 61/980,035, filed on Apr. 15, 2014.

(51) Int. Cl.

| | |
|---|---|
| ***F16M 13/00*** | (2006.01) |
| ***G07F 17/24*** | (2006.01) |
| ***E04H 12/22*** | (2006.01) |
| ***E01F 9/681*** | (2016.01) |
| ***E01F 9/615*** | (2016.01) |
| *E04H 6/42* | (2006.01) |

(52) U.S. Cl.

CPC .............. *G07F 17/24* (2013.01); *E01F 9/615* (2016.02); *E01F 9/681* (2016.02); *E04H 12/2238* (2013.01); *E04H 6/42* (2013.01)

(58) Field of Classification Search

CPC ... G07F 17/27; G06Q 20/127; E04H 12/2238; E04H 6/42; E01F 9/681

See application file for complete search history.

(56) References Cited

U.S. PATENT DOCUMENTS 3,420,013 A * 1/1969 Alvarado ............ E04F 11/1812 52/1

4,807,838 A * 2/1989 Anderson ............ A47B 13/023 248/188

6,058,675 A * 5/2000 MacDonald .............. E01F 9/61 52/834

6,446,411 B2 * 9/2002 Natelli, Jr. ................ E04C 3/29 52/170

7,278,240 B2 * 10/2007 Burkart ................. B29C 33/005 248/346.01

* cited by examiner

*Primary Examiner* — Amy Sterling

(74) *Attorney, Agent, or Firm* — Patterson Thuente Pedersen, P.A.

(57) ABSTRACT

A pole mounting system can be configured as a center drawn mounting system which allows the user to securely mount and adjust the inner stanchion in various rotational orientations about the vertical axis. The system also allows any electrical wiring or other conduit to be run up inside of the pole. Once the inner stanchion is fastened in place, the outer stanchion fits over top with a first disc on the outer stanchion interlocking with a disc recess on the inner stanchion, thereby preventing the outer stanchion from twisting with respect to the inner stanchion. Once a locking bolt is in place, the parking meter is fastened to the top of the outer stanchion. The present system is tamper resistant because the electrical wiring or conduit and the mounting hardware are not externally accessible once installation is completed.

10 Claims, 12 Drawing Sheets

102
103
105
109
112
114
116
118

A

PARKING METER POLE

PRIORITY

This application claims the priority benefit of U.S. Provisional Application No. 61/980,035 filed on Apr. 15, 2014, which is hereby incorporated herein by reference in its entirety.

FIELD

The present invention relates generally to poles for mounting parking meters and similar devices.

BACKGROUND

There is a need to mount parking meters at a given height above the ground to facilitate the ease of use by users parking their vehicles. Typically a parking meter is mounted on a pole. Conventional poles are simply a length of hollow steel tube. The metal tube is typically sunk into a recess formed in the concrete while it is still wet so that the hardened concrete retains the pole in place. Alternatively, a bottom mounting flange can be secured to the pole at the bottom end thereof, and the flange is fastened to bolts protruding from the cement slab.

The conventional pole systems present multiple drawbacks. First, it is difficult or impossible to run electrical power and communication lines or wiring up through the pole to the meter if the meter requires such connectivity. Second, the rotational alignment of the pole with respect to the meter cannot be changed. Thus, the meter may not be capable of being ideally aligned with respect to the street, or the pole must be replaced when the meter is replaced. Also, exposed mounting hardware at the base of the pole is vulnerable to vandals and thieves who may unbolt and steal the meter. Thus, there is a need for an improved pole mount, mounting system and method of mounting a parking meter.

SUMMARY

The present invention provides a unique pole mounting system for parking meters and the like. The pole mounting system can be configured as a center drawn mounting system which allows the user to securely mount and adjust the inner stanchion in various rotational orientations about the vertical axis. The system also allows any electrical wire or other conduit to be run up inside of the pole. Once the inner stanchion is fastened in place, the outer stanchion fits over top with a first disc on the outer stanchion interlocking with a disc recess on the inner stanchion, thereby preventing the outer stanchion from twisting. Once a locking bolt is in place and the meter is fastened to the top of the stanchion, there is no accessing any of the electrical or mounting hardware, which makes it tamper resistant.

The disclosure includes a parking meter mounting system. The system can include an inner stanchion comprising an elongated body having an upper end and an opposing lower end, and an outer stanchion, comprising an elongated hollow tubular body having an open top end and a bottom end, wherein the inner stanchion is disposed inside of the hollow tubular body. A support plate can be secured to the elongated body of the inner stanchion adjacent the lower end thereof. A receiving disc can be disposed atop the support plate, the receiving disc including an open interior defined by an inner circumference. An interlocking disc can be secured to the bottom end of the hollow tubular body of the outer stanchion, the interlocking disc having an outer circumferential shape configured to register with the inner circumference of the receiving disc to define multiple fixed rotational orientations of the outer stanchion about a vertical axis thereof. At least one aperture can be defined through the support plate to permit the passage of an electrical wiring. A gap also can be formed between the elongated body of the inner stanchion and the hollow tubular body of the outer stanchion of sufficient dimension to permit passage of the electrical wiring from the support plate to the top end of the upper stanchion.

The disclosure also includes a mounting device. The mounting device can include an inner stanchion, comprising an elongated body having an upper end and an opposing lower end, and an outer stanchion, comprising an elongated hollow tubular body having an open top end and a bottom end, wherein the inner stanchion is disposed inside of the hollow tubular body. A support plate can be secured to the elongated body of the inner stanchion adjacent the lower end thereof. A receiving disc can be disposed atop the support plate, the receiving disc including an open interior defined by an inner circumference. An interlocking disc can be secured to the bottom end of the hollow tubular body of the outer stanchion, the interlocking disc having an outer circumferential shape configured to register with the inner circumference of the receiving disc to define multiple fixed rotational orientations of the outer stanchion about a vertical axis thereof. A mounting block can be disposed inside the hollow tubular body adjacent the open top end thereof, wherein the mounting block is releasably secured to the inner stanchion.

The disclosure further includes a method of mounting a parking meter. The method can include securing an interlocking disc to a bottom end of an outer stanchion and disposing an outer stanchion over an inner stanchion assembly. An the interlocking disc of the outer stanchion can be disposed within one of a multiple of fixed rotational orientation positions defined in a recessed region of an inner stanchion assembly to secure the outer stanchion from future rotational movement. A mounting block can be disposed inside of the outer stanchion adjacent a top end thereof. The mounting block can be secured to the inner stanchion assembly. The parking can be secured atop the outer stanchion.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

Figure 1:
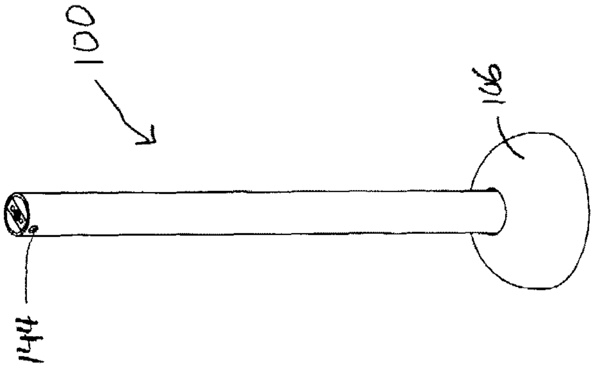
FIG. 1 is a perspective view of a pole system according to certain example embodiments.
Figure 4:
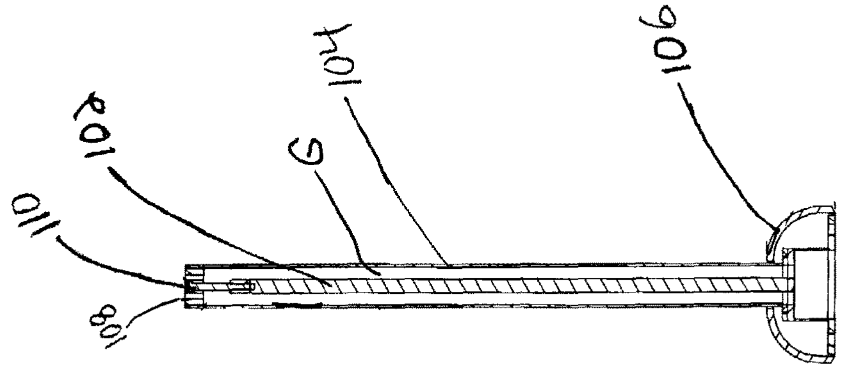
FIG. 4 is a cross-sectional view of a pole system along line A-A in FIG. 3, according to certain example embodiments.
Figure 2:
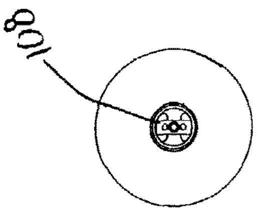
FIG. 2 is a top view of a pole system according to certain example embodiments.

In the following descriptions, the present invention will be explained with reference to various example embodiments. Nevertheless, these example embodiments are not intended to limit the present invention to any specific example, environment, application, or particular implementation described herein. Therefore, descriptions of these example embodiments are only provided for purpose of illustration rather than to limit the present invention. The invention is to cover all modifications, equivalents, and alternatives falling within the scope of the invention as defined by the appended claims. Dimensions and proportions of the various components can be varied without departing from the scope of the invention, unless specifically recited as limiting in a given claim.

Referring to FIGS. 1-4, the pole mounting system 100 generally comprises an inner stanchion 102, an outer stanchion 104 disposed over the inner stanchion, and a base cover 106 disposed over a base plate 118 of the inner stanchion. A mounting block 108 is disposed inside the top end of the outer stanchion 104 and is bolted to the inner stanchion 102 via an interlocking bolt 110.

A gap G is defined inside of the outer stanchion 104 between the inner surface of the outer stanchion and the outer surface of the inner stanchion to permit electrical wiring or conduit and other physical wires or conduit in the ground can to extend through the pole mounting system so that the meter mounted atop the pole system can be connected to said conduit or wiring.

Referring now to FIGS. 5-8, the inner stanchion 102 includes an elongated body 103 with a standoff 105 disposed at a top end thereof. The opposing lower end of the body 102 is secured to a support plate 112. A receiving disc 114 is disposed atop the support plate 112. These two components together define a recessed region 109 to receive an interlocking disc 120 of the outer stanchion 104 as will be explained later herein. The support plate 112 is also coupled to a top end of a base tube 116. The base tube 116 is also secured atop a base plate 118. The bottom side of the base plate 118 makes contact with the ground.

Referring next to FIGS. 9-12, the outer stanchion 104 comprises an elongated hollow tubular body 111 with an open top end and an interlocking disc 120 disposed at the bottom end thereof. The interlocking disc 120 is sized and shaped to be disposed in the recessed region 109 and register with the inner circumferential shape of the receiving disc 114 in a plurality of rotational orientations. A mounting block 122 is disposed inside of the outer stanchion 104 adjacent the top end of the body 111.

Figure 14:
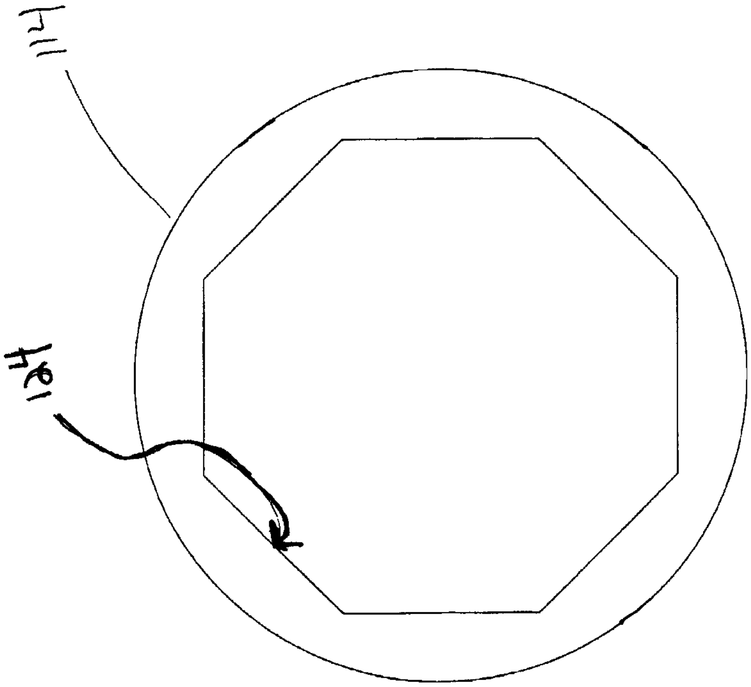
FIG. 14 is a front view of a receiving disc of an inner stanchion of a pole system according to certain example embodiments.
Figure 13:
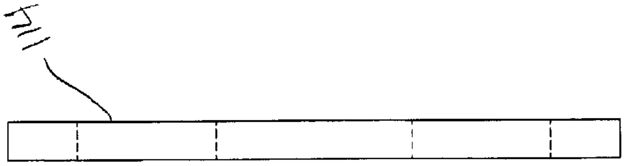
FIG. 13 is a side view of a receiving disc of an inner stanchion of a pole system according to certain example embodiments.

Referring to FIGS. 13-14, the receiving disc 114 of the inner stanchion 102 includes an inner circumference 124 shaped to define multiple fixed rotational orientations about the vertical axis. In the FIG. 14, the shape is shown to be octagonal, which will provide eight distinct possible orientations about the vertical axis. The inner perimeter shape 124 can be varied (e.g. hexagonal and pentagonal) to provide for more or fewer set points without departing from the scope of the invention. In addition, the shape need not be a uniform polygon, but can be an eccentric shape.

Figure 16:
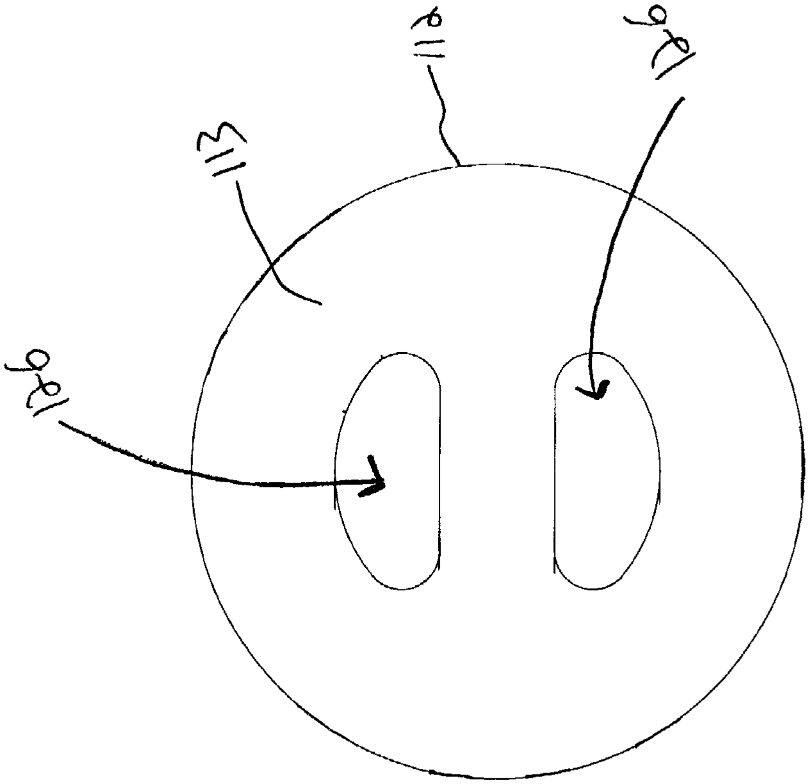
FIG. 16 is a front view of a support plate of an inner stanchion of a pole system according to certain example embodiments.
Figure 15:
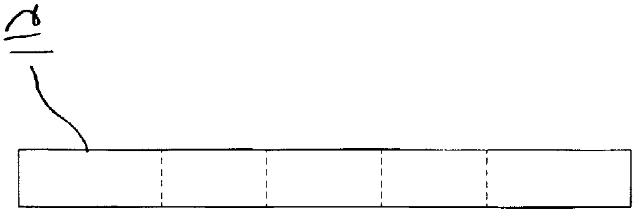
FIG. 15 is a side view of a support plate of an inner stanchion of a pole system according to certain example embodiments.

Referring to FIGS. 15-16 the support plate 112 includes a generally flat upper surface 113 for defining a cam surface to support the bottom surface of the interlocking disc 120 of the outer stanchion 104. A plurality of apertures 126 are defined through the support plate 112 to permit the passage of electrical and network wiring, or other physical connection conduits, through the hollow center of the outer stanchion 104 to a meter disposed atop the outer stanchion 104.

Figure 18:
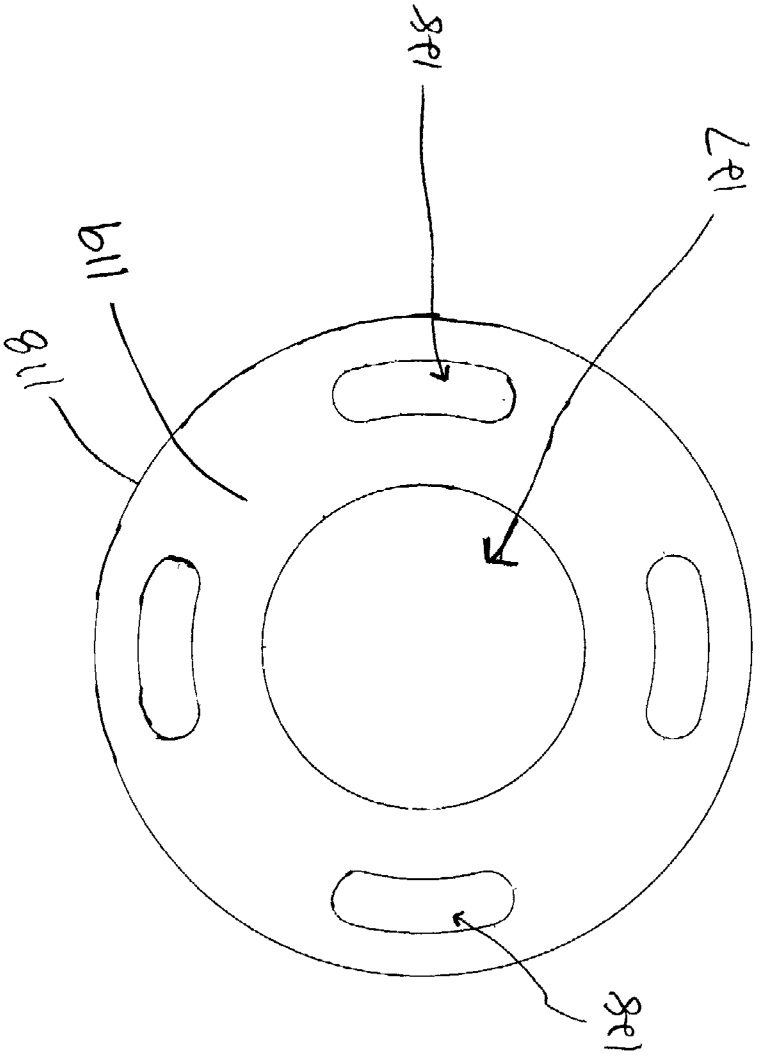
FIG. 18 is a front view of a base plate of an inner stanchion of a pole system according to certain example embodiments.
Figure 17:
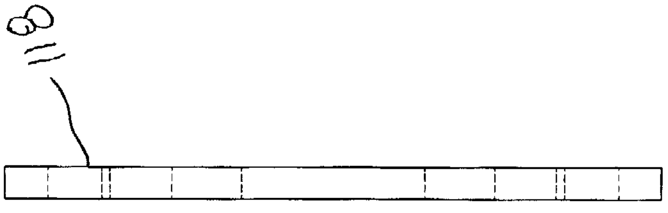
FIG. 17 is a side view of a base plate of an inner stanchion of a pole system according to certain example embodiments.

Referring to FIGS. 17-18 the base plate 118 comprises a generally flat disc body 119 with a centrally located opening 127 through the disc body 119 and a plurality of apertures 128 arrayed around the disc body 119 and extending through the disc body 119. The apertures 128 are circumferentially elongated to allow bolts or other fastening members or means to extend upward from the concrete slab and protrude upward through the plate apertures 128, which are then secured in place with respect to the base plate 118. Thus, the base plate 118 permits some degree of rotational adjustment before being secured rigidly to the ground (e.g. concrete sidewalk) so that it cannot move.

Figure 20:
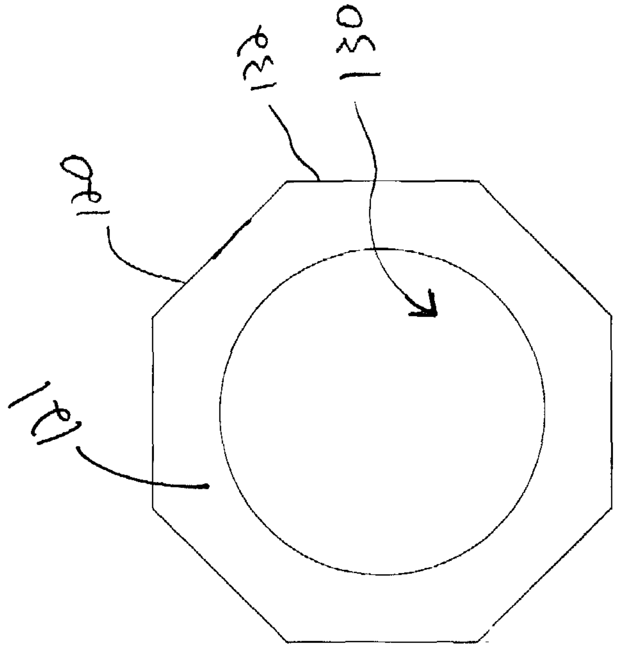
FIG. 20 is a front view of an interlocking disc of an outer stanchion of a pole system according to certain example embodiments.
Figure 19:
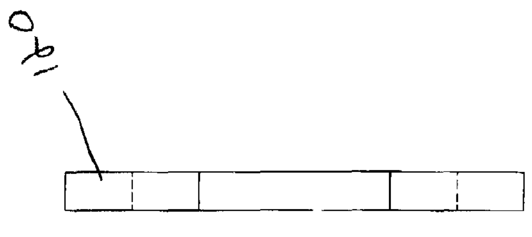
FIG. 19 is a side view of an interlocking disc of an outer stanchion of a pole system according to certain example embodiments.

Referring to FIGS. 19-20, the interlocking disc 120 of the outer stanchion 104 generally comprises a flat disc body 121 with a central opening 130 defined therethrough. The center opening 130 permits passage of the previously noted network and power conduits. The outer perimeter 132 is shaped and sized to interlock with the inner circumference 124 of the receiving disc 114.

Figure 23:
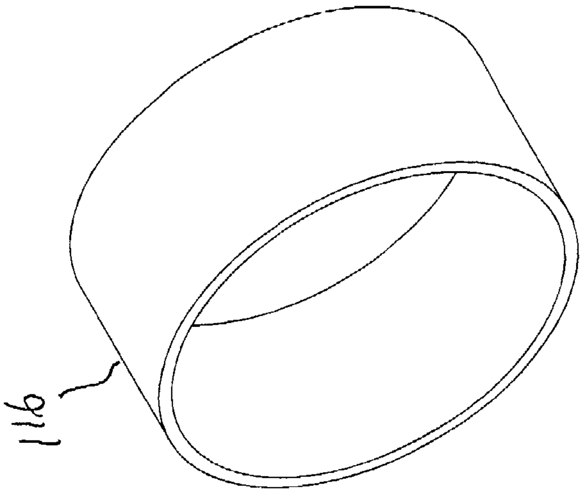
FIG. 23 is a perspective view of a base tube of an inner stanchion of a pole system according to certain example embodiments.
Figure 22:
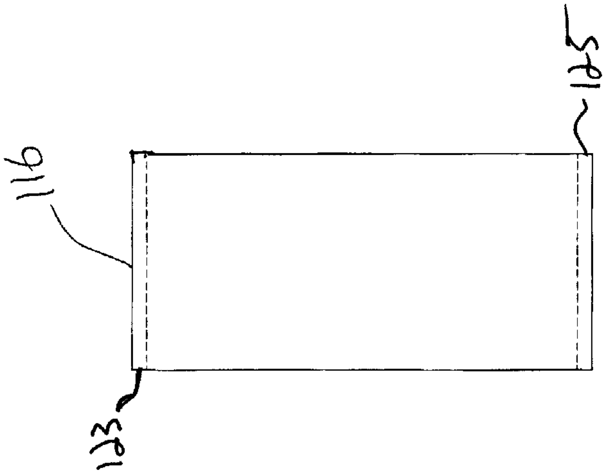
FIG. 22 is a side view of a base tube of an inner stanchion of a pole system according to certain example embodiments.
Figure 21:
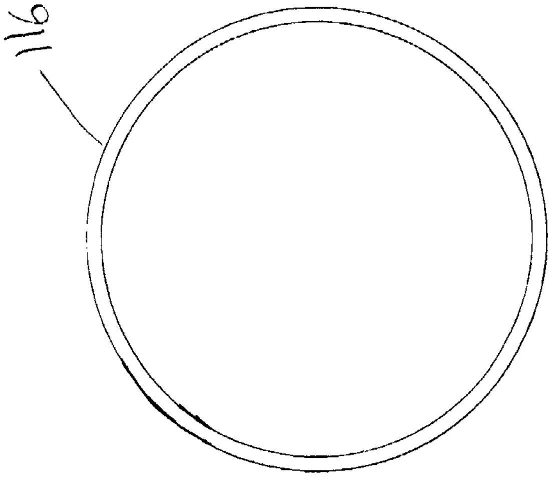
FIG. 21 is an end view of a base tube of an inner stanchion of a pole system according to certain example embodiments.

Referring to FIGS. 21-23, base tube 116 comprises a ring-shaped body having a central opening. The planes of the respective top 123 and bottom ends 125 are parallel to one another.

Figure 25:
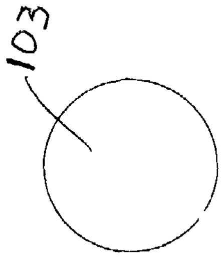
FIG. 25 is an end view of a connecting rod of an inner stanchion of a pole system according to certain example embodiments.
Figure 24:
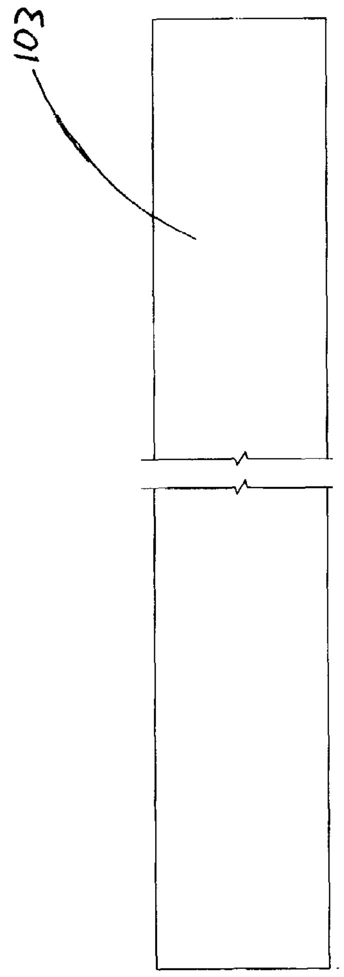
FIG. 24 is a side view of a connecting rod of an inner stanchion of a pole system according to certain example embodiments.

Referring to FIGS. 24-25, the connecting rod or elongated body 103 of the inner stanchion 102 comprises an elongated solid body with a circular cross-sectional shape. However, the body could also be made hollow and/or have a non-circular cross-sectional shape (e.g. semi-circular and polygonal). The length of the rod 103 depends on the height above the ground that the meter will be mounted. The width and shape of the body 103 can be varied to accommodate conduit within the outer stanchion 104.

Figure 3:
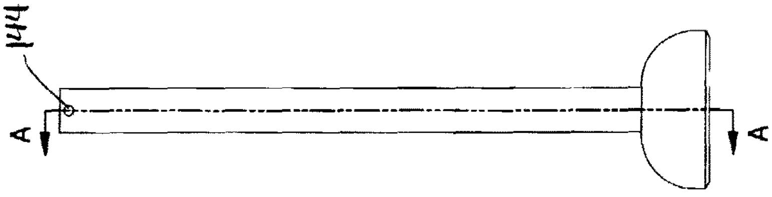
FIG. 3 is a side view of a pole system according to certain example embodiments.
Figures 5, 6, 7, 8:
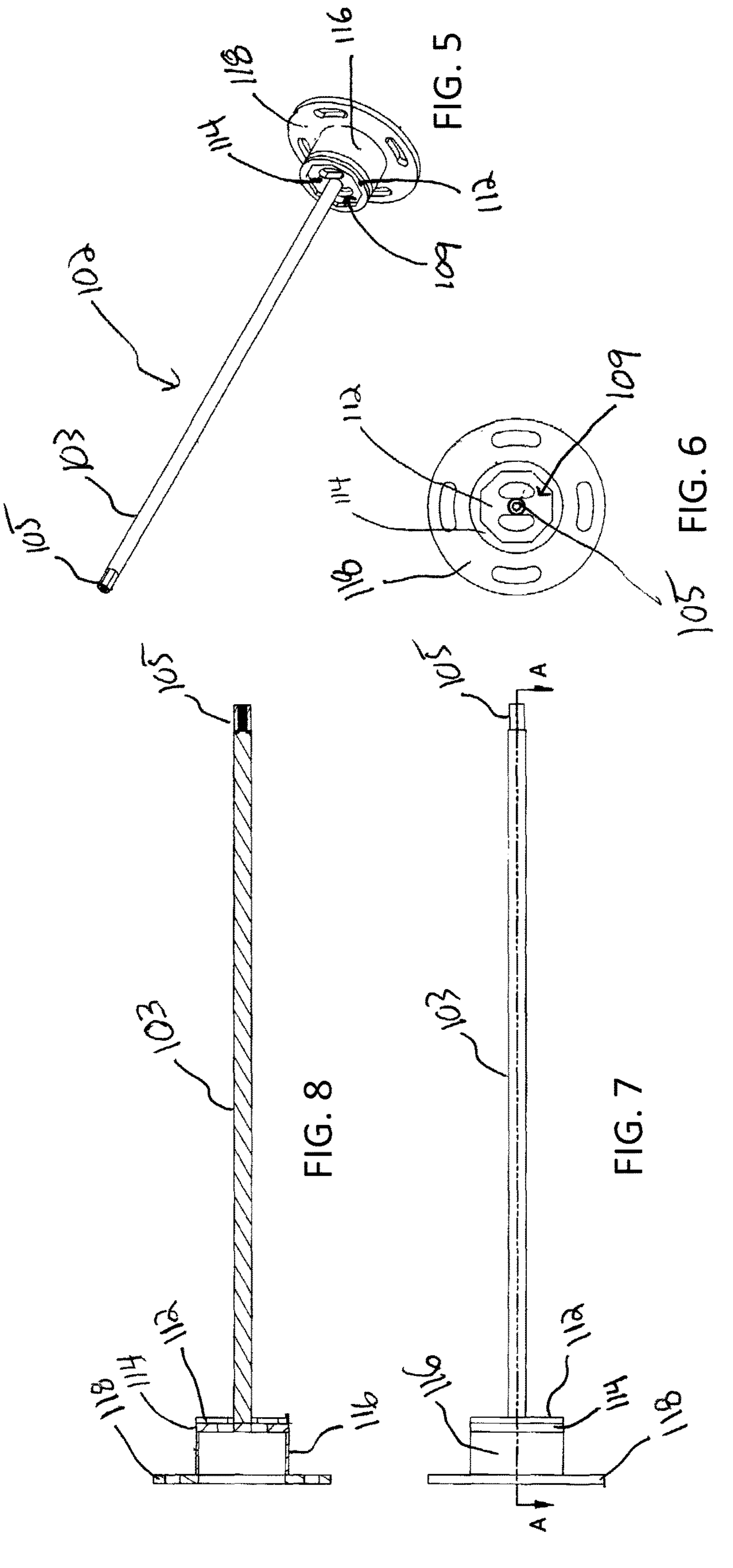
FIG. 5 is a perspective view of an inner stanchion of a pole system according to certain example embodiments.
FIG. 6 is a top view of an inner stanchion of a pole system according to certain example embodiments.
FIG. 7 is a side view of an inner stanchion of a pole system according to certain example embodiments.
FIG. 8 is a cross-sectional view of an inner stanchion of a pole system along line A-A in FIG. 7, according to certain example embodiments.
Figure 9:
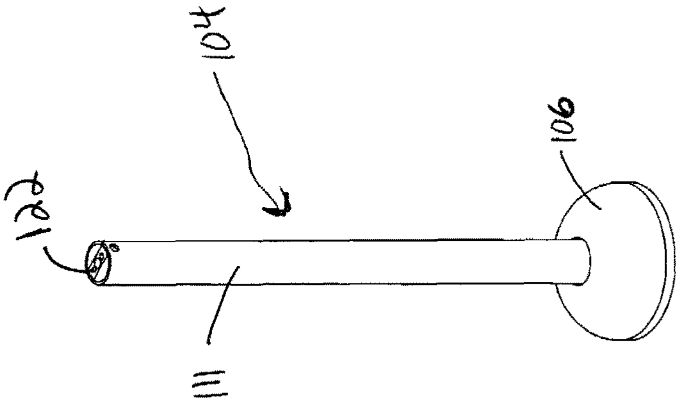
FIG. 9 is a perspective view of an outer stanchion of a pole system according to certain example embodiments.
Figure 12:
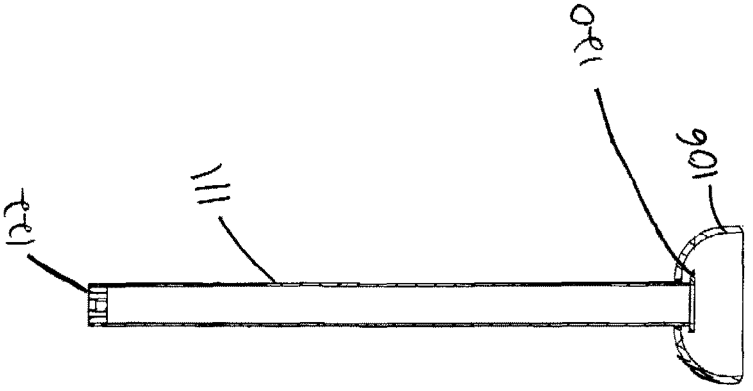
FIG. 12 is a cross-sectional view of an outer stanchion of a pole system along line A-A in FIG. 11, according to certain example embodiments.
Figure 10:
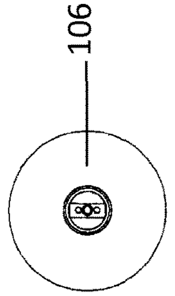
FIG. 10 is a top view of an outer stanchion of a pole system according to certain example embodiments.
Figure 11:
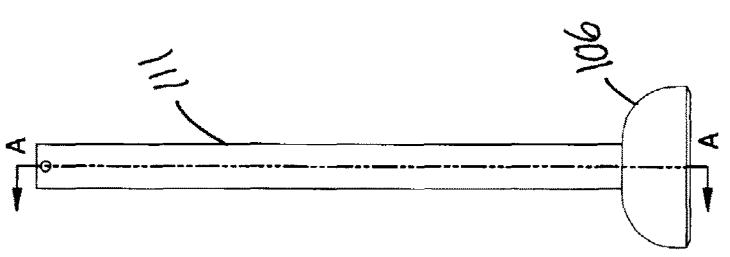
FIG. 11 is a side view of an outer stanchion of a pole system according to certain example embodiments.
Figure 27:
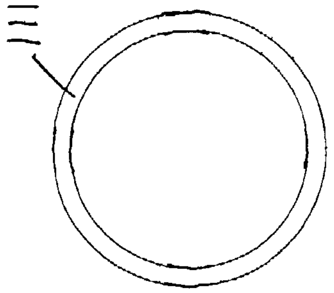
FIG. 27 is an end view of an outer tune of an outer stanchion of a pole system according to certain example embodiments.
Figure 26:
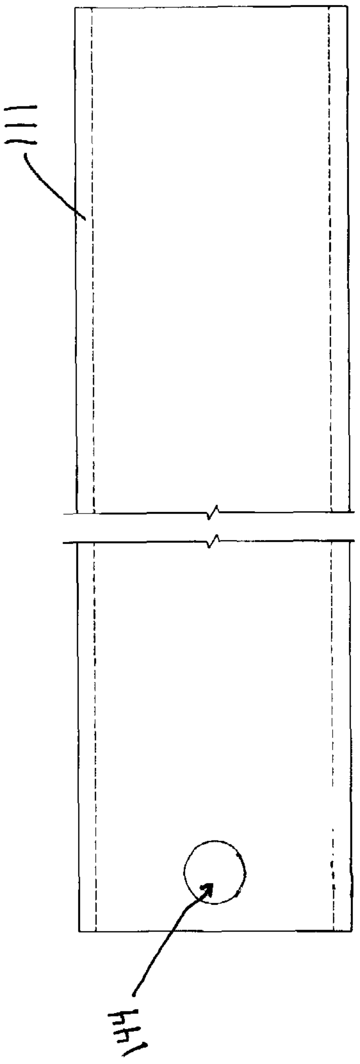
FIG. 26 is a side view of an outer tube of an outer stanchion of a pole system according to certain example embodiments.
Figure 28:
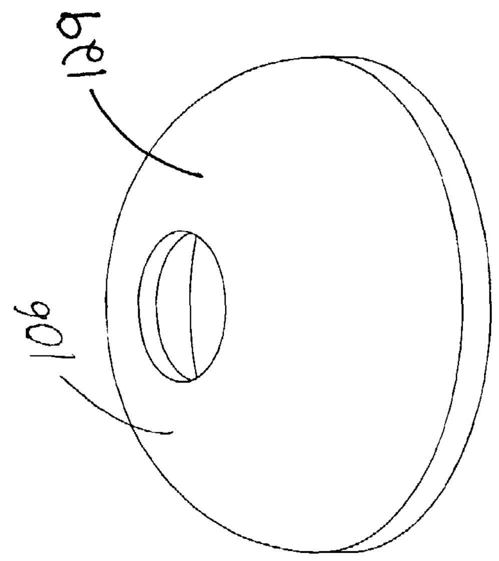
FIG. 28 is a perspective view of a base cover of a pole system according to certain example embodiments.
Figure 29:
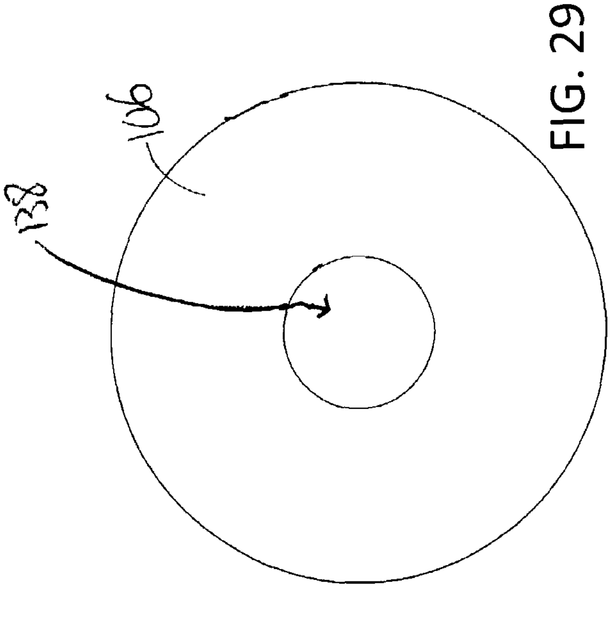
FIG. 29 is a top view of a base cover of a pole system according to certain example embodiments.
Figure 30:
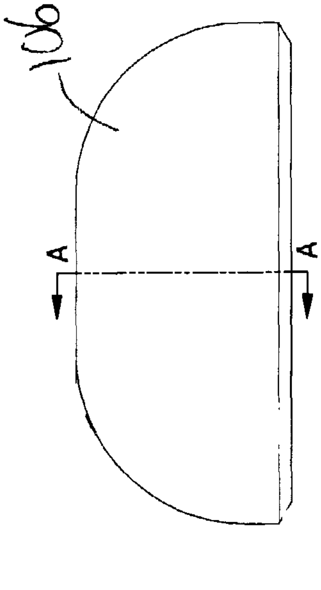
FIG. 30 is a side view of a base cover of a pole system according to certain example embodiments.
Figure 31:
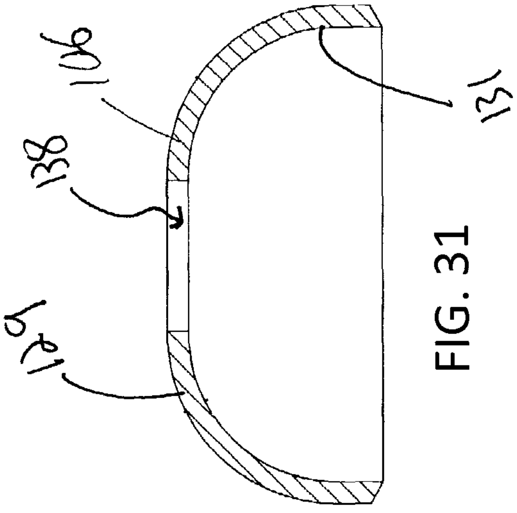
FIG. 31 is a cross-sectional view of a base cover of a pole system along line A-A in FIG. 30, according to certain example embodiments.

Referring to FIGS. 26-27, the body 111 of outer stanchion 104 comprises an elongated hollow tubular shape with a circular cross-section. However, the body 111 could also be formed of a non-circular cross-sectional shape (e.g. semi-circular and polygonal). The length of the body 111 depends on the height above the ground that the meter will be mounted. The width and shape can be varied to accommodate conduit. One or more meter mounting holes 144 can be defined in the body 111 adjacent the upper end of the outer stanchion 104 as shown in FIGS. 1 and 3 for securing the meter in place.

Referring to FIGS. 28-31, the base cover 106 includes a top aperture 138 sized to permit passage of the outer tube 136, but not the interlocking disc 120. The diameter of the aperture 138 is preferably very similar to the outer diameter of the body 111 of the outer stanchion 104. The cover 106 includes a domed upper surface 129 and recessed bottom surface 131. The bottom surface defines an enclosed area between the base cover 106 and the base plate 118 when the pole mounting assembly 100 is assembled. Thus, the cover 106 covers over and protects the fasteners used to fasten the base plate 118 to the ground.

Figure 32:
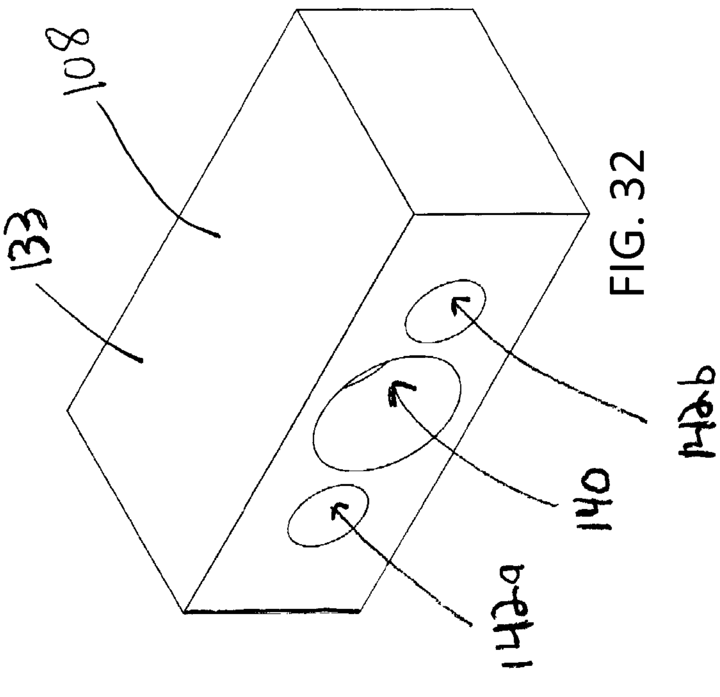
FIG. 32 is a perspective view of a mounting block of a pole system according to certain example embodiments.
Figure 33:
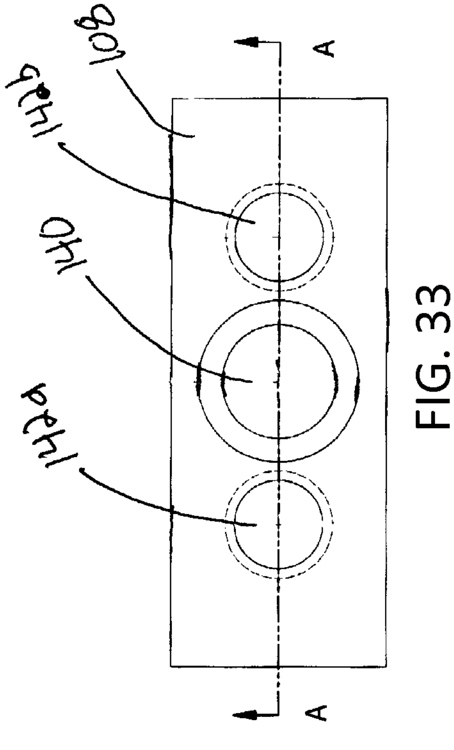
FIG. 33 is a top view of a mounting block of a pole system according to certain example embodiments.
Figure 34:
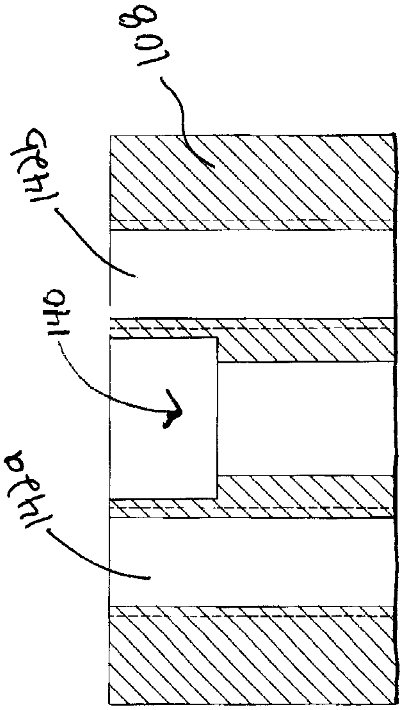
FIG. 34 is a cross-sectional view of a mounting block of a pole system along line A-A in FIG. 33, according to certain example embodiments.

Referring to FIGS. 32-34, the mounting block 108 comprises a rectangular body 133 with a plurality of apertures 140 and 142 defined therein. The block 108 is sized to fit inside of the inner diameter of the outer stanchion 104 and leave gaps between the block body 133 and inner surface of the outer stanchion so that electrical conduit and other connections can pass though to the meter.

The block body 133 includes a central aperture 140 passing through the body from top to bottom. The central aperture 140 is sized to permit passage of the locking bolt 110 through the body 133. The central aperture 140 also can be shaped to receive a head portion of the locking bolt 110. First and second parking meter locking apertures **142*a* and 142*b* are disposed laterally adjacent the central aperture 140. The meter locking apertures 142*a* and 142*b* are configured to provide a means to securely couple the meter head to the pole assembly 100**.

A wide variety of parking meters or other mechanical and electrical devices can be mounted to the present pole device or system 100. The system 100 can be used in any instance where a mechanical or electrical device needs to be secured to the ground and securely mounted at an elevation above the ground while electrical or other conduit passes internally though the outer stanchion.

The various components described herein can be formed from any suitable rigid material, such as metal, fiber glass, plastics, etc. In one example, the parts are formed of steel. The parts can be plated, coated or painted as is known in the art for various functional (e.g. rust protection) and aesthetic reasons.

In use, the inner stanchion 102 is assembled. Any electrical/communications wiring is fed up through the center of the base plate 118 and the base plate 118 is fastened to the concrete (ground). The outer stanchion 104 is disposed over the inner stanchion 102 and the interlocking disc 120 is secured in a given orientation with respect to the inner stanchion 102. The base cover 106 can be welded to the outer stanchion prior to assembly of the pole system. The cover 106 thus covers the mounting hardware when the outer stanchion 104 is installed. The mounting block 108 is also pre-welded or secured into the top end of the outer stanchion 104 before system assembly. The locking bolt 110 is tightened to lock the outer stanchion 104 in a fixed rotational position about the vertical axis. After the stanchions 102 and 104 are in place, then the meter is disposed over the upper end of the outer stanchion 104 and coupled to the mounting block 108 and the outer stanchion 104. Note that there are additional mounting holes 144 defined adjacent the upper end of the outer stanchion as shown in FIGS. 1 and 3 for securing the meter in place.

The rotational alignment of the meter about the vertical axis can be adjusted by loosening the stanchion locking bolt 110 enough to back the interlocking disc 120 out of engagement with the receiving disc 114. Then the outer stanchion 104 can be rotated with respect to the inner stanchion 102. The locking bolt 110 is then tightened to again secure the outer stanchion in place 104. The meter is then fastened to the pole assembly 100 as noted above.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. A mounting device, comprising:

an inner stanchion, comprising an elongated body having an upper end and an opposing lower end;

an outer stanchion, comprising an elongated hollow tubular body having an open top end and a bottom end, wherein the inner stanchion is disposed inside of the hollow tubular body;

a support plate secured to the elongated body of the inner stanchion adjacent the lower end thereof;

a receiving disc disposed atop the support plate, the receiving disc including an open interior defined by an inner circumference;

an interlocking disc secured to the bottom end of the hollow tubular body of the outer stanchion, the interlocking disc having an outer circumferential shape configured to register with the inner circumference of the receiving disc to define multiple fixed rotational orientations of the outer stanchion about a vertical axis thereof; and a mounting block disposed inside the hollow tubular body adjacent the open top end thereof, wherein the mounting block is releasably secured to the inner stanchion.

2. The device of claim 1, wherein at least one aperture is defined through the support plate to permit the passage of a conduit, and wherein a gap is formed between the elongated body of the inner stanchion and the hollow tubular body of the outer stanchion of sufficient dimension to permit passage of the conduit from the support plate to the mounting block.

3. The system of claim 1, further comprising:

a base plate; and a base tube disposed atop the base plate, wherein the support plate is disposed atop the base tube.

4. The system of claim 3, further comprising a base cover secured over the base plate, the base cover defining an enclosed area between the base cover and the base plate, the base cover further comprising an opening through the base cover, the opening having a circumference greater than a circumference of the elongated hollow tubular body and less than a circumference of the interlocking disc.

5. The system of claim 3, wherein the base plate comprises a generally flat disc body with a centrally located opening through the disc body and a plurality of apertures arrayed around the disc body and extending through the disc body, the plurality of apertures being circumferentially elongated.

6. The system of claim 1, wherein the elongated hollow tubular body of the outer stanchion has a circular cross-sectional shape and wherein the elongated body of inner stanchion has a circular cross-sectional shape.

7. The system of claim 1, wherein the mounting block includes a plurality of apertures defined vertically through the mounting block, wherein at least one of the plurality of apertures permits mounting of a parking meter atop the outer stanchion and at least one of the plurality of apertures is configured to receive a locking fastener coupled to the upper end of the inner stanchion.

8. The system of claim 1, wherein the mounting block is configured to permit passage of a conduit to a parking meter secured atop the outer stanchion.

9. The system of claim 1, wherein at least one aperture is defined through the support plate to permit the passage of an electrical wiring.

10. The system of claim 1, wherein a gap is formed between the elongated body of the inner stanchion and the hollow tubular body of the outer stanchion of sufficient dimension to permit passage of an electrical wiring from the support plate to the top end of the upper stanchion.

* * * * *